United States Patent

Lechner

[11] 3,844,630
[45] Oct. 29, 1974

[54] DEVICE FOR THE SOFT AND ELASTIC BEARING SUPPORT OF SHAFTS ROTATING AT HIGH SPEEDS

[76] Inventor: Karl Lechner, Heidestrasse 15, 8031 Grobenzell, Germany

[22] Filed: Aug. 31, 1973

[21] Appl. No.: 393,271

[30] Foreign Application Priority Data
Aug. 31, 1972  Germany............................ 2242852

[52] U.S. Cl. ............................................. 308/184
[51] Int. Cl. ........................................... F16c 27/00
[58] Field of Search .................................. 308/184

[56] References Cited
UNITED STATES PATENTS
3,332,726  7/1907  Cooper.............................. 308/184

Primary Examiner—Charles J. Myhre
Assistant Examiner—Frank Susko
Attorney, Agent, or Firm—Craig & Antonelli

[57] ABSTRACT

Apparatus for supporting a rotatable shaft including a roller or ball bearing directly rotatably supporting the shaft, an inner bearing body directly supporting the bearing which has an annular flange extending radially outwardly, and an outer bearing body in surrounding relationship to the inner body with the annular flange projecting into an annular recess of the outer body and with the bodies spaced axially and radially from one another to form respective partial pressure medium chambers at respective opposite axial sides of the flange. Pressure oil is continuously supplied to the pressure medium chambers to serve as a cushion for axially and radially directed force transfers between the inner and outer bearing bodies. In order to accommodate axial loading of the shaft in one direction, means are provided for effecting a total higher fluid pressure force in one direction against the flange than in the opposite direction. In a first embodiment, the different pressure force is obtained by separate fluid supply lines for supplying fluid at different pressures to the respective chambers. A second preferred embodiment includes a common pressure line for supplying fluid at the same pressure to both chambers, with one of the chambers being designed to have a larger pressure surface than the other.

16 Claims, 2 Drawing Figures

DEVICE FOR THE SOFT AND ELASTIC BEARING SUPPORT OF SHAFTS ROTATING AT HIGH SPEEDS

BACKGROUND AND SUMMARY OF THE INVENTION

Commonly assigned British Pat. No. 1,212,599 (German Pat. No. 1,575,568) relates to a device designed for the soft and/or elastic bearing support or positioning of the shafts of rotating machine parts revolving at high speed. A pressure medium chamber is used in the device for the formation of a hydraulic cushion which serves for damping the vibrations arising in the bearing with a pressure medium being continuously supplied to the pressure medium chamber, which pressure medium, after flowing through the pressure medium chamber, may be also continuously led off or discharged again toward the outside. The bearing is retained axially and radially without play within an inner bearing body which is equipped with an annular flange extending radially outwardly, which flange projects into a recess of an outer bearing body. The axial play of the annular flange with respect to the outer bearing body together with the radial play between the outer bearing body and the inner bearing body forms two partial pressure medium chambers which are connected with each other.

The above-mentioned device is designed to relieve the bearing to a greater extent than is the case in solutions previous thereto. In order to effect this bearing relief the partial pressure medium chambers are sealed off toward the outside at the axially outer ends thereof by means of gasket rings or journal bearing seals separated at the outer circumference of the annular flange by means of seal, and are connected with each other by axial throttle bores in the annular flange.

While this above-described construction does indeed afford the possibility to so provide a bearing with, or being subjected to, an alternating axial and radial load or stress, such as vibrations, for example, that these vibrations are damped to acceptable or tolerable values, it has the residual disadvantage that, in bearings with a one-sidedly oriented axial basic or essential load, the annular flange extending radially outwardly into the recess of the housing part will come to be positioned or abut against one lateral wall of the recess, due to the basic or essential load, whereby, firstly, it will lose its damping capacity to a large extent and, secondly, an undesirable wear and tear will be produced at this lateral wall because of the radial vibrations.

It is contemplated by the present invention to avoid, in a bearing of the type described above which is subjected to an axial basic or essential load, the axial application or abutment of the annular flange, and to thereby under these conditions increase also the full damping capacity of the bearing, and therewith the useful life thereof.

The present invention contemplates one preferred embodiment for avoiding the axial abutment of the radially extending annular flange which includes two partial chambers, at opposite sides of the flange, each connected with a proper supply line for oil of different or variable pressure, as well as with one discharge line. As a result, variable pressures are obtained in the partial chambers whose difference counteracts the axial basic or essential load and thus avoids the wear and tear of the abutment surfaces, reduces the stress peaks in the bearing, and increases the useful life of the latter. The annular flange is free from axial throttle bores between the two partial chambers so that appropriate control of the relative pressure in the partial chambers can be effected.

According to a further embodiment of the present invention, a restrictor is built into the discharge line of the partial oil damping chamber having the higher pressure, whereby the delivery of the oil pump is optimized.

According to another preferred embodiment of the present invention, the outside diameter of the inner bearing carrier flange on the side of the higher pressure partial chamber, as well as the diameter of the respectively coordinated bore is chosen to be smaller than that on the side of the other lower pressure chamber such that the radially extending annular flange exhibits a larger axially facing surface at the high pressure side than at the lower pressure side. A common pressure oil feed or lead-in and a common discharge line are provided for both partial chambers. As a result, the hydraulically operative or effective surface on the high pressure side is increased, whereby the axial basic or essential load may be compensated for without requiring a pressure oil feed with different pressures and different lines to the two respective partial chambers.

These and further objects, features and advantages of the present invention will become more obvious from the following description when taken in connection with the accompanying drawings, which show, for purposes of illustration only, several embodiments in accordance with the present invention.

DETAILED DESCRIPTION OF THE DRAWINGS

Figure 1:
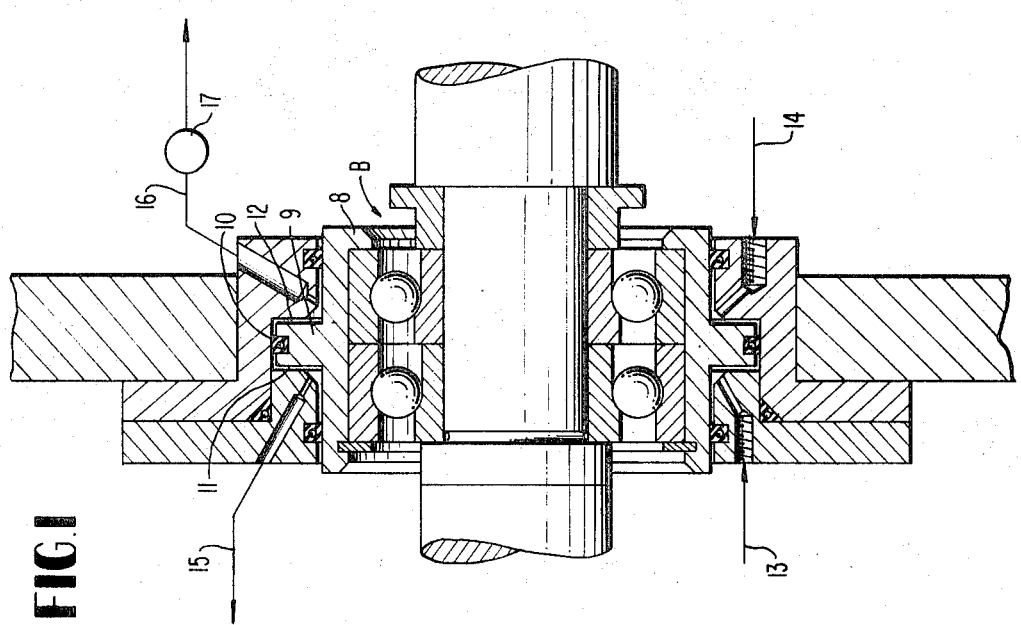
FIG. 1 is a cross-sectional schematic view of a bearing arrangement constructed in accordance with a first embodiment of the present invention.

Referring to FIG. 1, inner bearing body 8 has a flange 9 being free from axial bores which comprises at the outside a seal 10 for purposes of the mutual sealing-off partial chambers 11 and 12. The supply of pressure oil at the lower pressure $p_1$ toward the partial chamber 11 is effected through line 13, while the oil at the higher pressure $p_2$ reaches the partial chamber 12 by way of line 14. Through discharge line 15 the oil can freely flow from the partial chamber 11 back toward either an oil reservoir (not shown) or reservoir or toward a pump (not shown), whereas the oil being discharged from the partial chamber 12 by way of the line 16 first passes through a choke bore 17 before flowing to a reservoir or pump.

The bearing B is depicted as a roller bearing having an inner race attached at the shaft and the outer race axially and radially fixedly supported in the inner bearing body 8. The outer bearing body is formed of two parts connectible with one another so as to accommodate the installation with the flange 9 of the inner bearing body disposed within the recess thereof.

Figure 2:
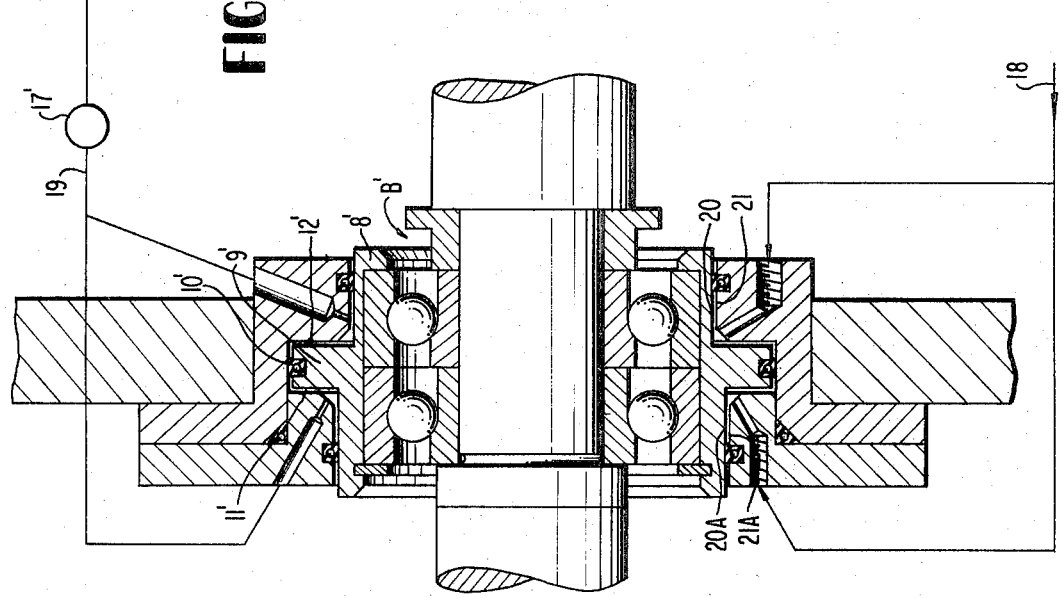
FIG. 2 is a cross-sectional schematic view of a bearing arrangement constructed in accordance with a second embodiment of the present invention.

FIG. 2 illustrates another preferred embodiment which is similar to FIG. 1 except for the specific arrangement of the partial chambers and the utilization of a common pressure supply line for effecting different pressure forces at opposite sides of the flange. Primed reference characters are used in FIG. 2 to depict corresponding parts as in FIG. 1. Different effective axially facing pressure surface areas at opposite sides of flange 9' are obtained by constructing the inner bearing carrier outer diameter at 20 and associated bore 21 for chamber side 12' as smaller than corresponding diameters 20A and 21A for chamber side 11'. With this arrangement, a common pressure oil feed or lead in 18 results in a greater force on flange 9' in partial chamber 12' than in partial chamber 11'. A common return line 19 is provided for continuously returning or discharging the pressure oil, with a restrictor 17' arranged therein.

Details of the pump or other means for effecting the supply of pressure oil in lines 18, 13 and 14, as well as the remainder of the circuit for the discharge lines 15, 16 and 19 are not included herein, since one skilled in the art, given the present disclosure, could construct appropriate means for effecting the desired oil flow. For example, a reservoir and pump could be interposed between the inlets and discharge lines to continuously recycle the cushioning oil through the chambers 11, 12, 11', 12'.

In the FIG. 2 embodiment seal 10' may be omitted and a smaller radial play substituted therefor.

While I have shown and described only several embodiments in accordance with the present invention, it is understood that the same is not limited thereto but also contemplates numerous changes and modifications as would be known to those skilled in the art given the present disclosure of the invention, and I therefore do not wish to be limited to the details shown and described herein only schematically but intend to cover all such changes and modifications.

I claim:

1. Apparatus for supporting a rotatable shaft comprising:
   bearing means including means for directly rotatably supporting a shaft,
   an inner bearing body directly supporting an outer portion of said bearing means, said inner bearing body including an annular flange extending radially outwardly,
   an outer bearing body in surrounding relationship to said inner bearing body with said annular flange projecting into an annular recess of said outer bearing body, said inner and outer bearing bodies being normally spaced from one another in the radial direction and the walls of said recess being spaced axially from respective axially facing surfaces of said annular flange to form first and second partial pressure medium chambers at respective opposite axial sides of said flange,
   and pressure fluid supply means for supplying pressure fluid into each of said first and second chambers such that said pressure fluid serves to cushion axially and radially directed force transfers between said inner and outer bearing bodies,
   wherein means are provided for effecting a higher total axial fluid pressure force against said flange by the pressure fluid medium in said first chamber than by the pressure fluid medium in said second chamber.

2. Apparatus according to claim 1, wherein said first and second chambers are sealed off from one another by a seal extending around the circumference of said annular flange.

3. Apparatus according to claim 2, wherein each of said first and second chambers are sealed off against the outside at their respective axially outer ends by gasket rings interposed between the inner and outer bearing bodies.

4. Apparatus according to claim 1, wherein said fluid pressure medium is a liquid.

5. Apparatus according to claim 1, wherein said fluid pressure medium is oil.

6. Apparatus according to claim 1, wherein said outer bearing body is substantially fixed in position.

7. Apparatus according to claim 1, wherein said pressure fluid supply means includes a first supply line for supplying fluid at a first pressure to said first chamber and a second supply line for supplying fluid at a second pressure to said second chamber, said first pressure is higher than said second pressure.

8. Apparatus according to claim 1, wherein said pressure fluid supply means includes means for continuously supplying said pressure fluid, and wherein discharge means are provided for continuously discharging pressure fluid from said chambers.

9. Apparatus according to claim 8, wherein said pressure fluid supply means includes a first supply line for supplying fluid at a first pressure to said first chamber and a second supply line for supplying fluid at a second pressure to said second chamber, said first pressure is higher than said second pressure.

10. Apparatus according to claim 9, wherein said discharge means includes separate discharge lines leading from the respective chambers, and wherein a restrictor is provided in the discharge line leading from said first chamber.

11. Apparatus according to claim 1, wherein said pressure fluid supply means includes a common supply line for supplying both of said chambers with fluid at the same pressure, and wherein the annular flange exhibits a larger axially facing pressure surface in said first chamber than in said second chamber.

12. Apparatus according to claim 11, wherein said pressure fluid supply means includes means for continuously supplying said pressure fluid, and wherein discharge means are provided for continuously discharging pressure fluid from said chambers.

13. Apparatus according to claim 12, wherein said discharge means includes a common discharge line communicating directly with both chambers.

14. Apparatus according to claim 13, wherein a restrictor is provided in said common discharge line downstream of both of said chambers.

15. Apparatus according to claim 11, wherein each of said first and second chambers are sealed off against the outside at their respective axially outer ends by gasket rings interposed between the inner and outer bearing bodies.

16. Apparatus according to claim 13, wherein said fluid pressure medium is oil.

* * * * *